ated Sept. 21, 1971

United States Patent [11] 3,607,642

| [72] | Inventors | Thomas B. Murdock;<br>Jack N. Fox, both of San Jose, Calif. |
|---|---|---|
| [21] | Appl. No. | 778,999 |
| [22] | Filed | Nov. 26, 1968 |
| [45] | Patented | Sept. 21, 1971 |
| [73] | Assignee | General Electric Company |

[54] NUCLEAR REACTOR FUEL ASSEMBLY
18 Claims, 9 Drawing Figs.

[52] U.S. Cl. ............................................. 176/78,
176/81, 176/43
[51] Int. Cl. ............................................. G21c 3/30
[50] Field of Search............................. 176/81, 76,
78, 87, 43

[56] References Cited
UNITED STATES PATENTS

| 3,096,264 | 7/1963 | Bauer................... | 176/81 X |
| 3,150,057 | 9/1964 | Monson et al. ....... | 176/81 X |
| 3,274,069 | 9/1966 | Alfillie.................. | 176/81 X |
| 3,281,325 | 10/1966 | Hennig.................. | 176/81 X |
| 3,290,224 | 12/1966 | Robertson............. | 176/81 |
| 3,309,283 | 3/1967 | Alfillie et al. ........ | 176/81 X |
| 3,361,640 | 1/1968 | Hassig et al........... | 176/81 X |
| 3,186,913 | 6/1965 | Weisner et al. ....... | 176/78 |
| 3,310,474 | 3/1967 | Saunders............... | 176/78 X |

*Primary Examiner*—Benjamin R. Padgett
*Assistant Examiner*—Gary Solyst
*Attorneys*—Ivor J. James, Jr., Samuel E. Turner, John R. Duncan, Frank L. Neuhauser, Oscar B. Waddell and Melvin M. Goldenber

ABSTRACT: An assembly comprising a plurality of rods containing fissionable material is disclosed. Typically, the fuel rods are arranged in a hexagonal parallel array, with the rods spaced from each other by wires wound around and down each rod in a spiral manner. The rods are fastened only at the bottom, to a plurality of spaced support bars. The assembly is surrounded by a shroud terminating in inlet and outlet orifices or transitions at the ends. The lower orifice is adapted to fit in an opening in a plate, while allowing slight transverse movement of the shroud and fuel rods relative to the lower orifice. Also, improved flow and heat transfer characteristics are obtained where at least some of the wires in the row of fuel rods adjacent the assembly shrouds are formed from thin tubes, which are flattened slightly where they contact the shroud to decrease the size of the fluid flow gap between the fuel rods and the shroud.

PATENTED SEP 21 1971 3,607,642

INVENTORS
THOMAS B. MURDOCK
JACK N. FOX

BY *John R. Duncan*
ATTORNEY

NUCLEAR REACTOR FUEL ASSEMBLY

BACKGROUND OF THE INVENTION

The nuclear chain fission reactions and the reactors in which they take place are now well known. A typical reactor includes a chain-reacting assembly or core made up of nuclear fuel material contained in fuel elements. The fuel material is generally encased in corrosion-resistant heat-conductive containers or cladding. The reactor core, made up of a plurality of these fuel elements or rods in spaced relationship plus control rods or blades, in-core instrumentation, etc., is enclosed in a container or core shroud through which the reactor coolant flows. As the coolant passes between the spaced fuel rods, it is heated by thermal energy released in the fuel during the fission reaction. The heated coolant then leaves the reactor, the heat energy is used to perform useful work such as by driving a turbine-generator set to produce electrical power, and the now-cooled coolant is recycled back to the reactor.

In modern commercial water-cooled reactors, such as those described in U.S. Pat. No. 3,029,197, the core is generally made up of a plurality of subassemblies or bundles, each of which consists of a plurality of rod-shaped fuel elements held in a spaced parallel relationship. Typically, an assembly may contain 49 fuel rods having a diameter of about 0.5 inch and a length of about 10 feet. The rods are maintained in the desired arrangement by tie plates at each end and several lateral spacing and support means along the assembly length. In fast breeder-type reactors, each assembly may contain 250 to 750 rods, each having a diameter of 0.25 inch or less. Maintaining this number of very thin rods in the desired parallel array is especially difficult.

Prior reactor designs have been largely a compromise among various conflicting variables. For example, it is desirable that control rods or blades enter the core from the top, so that gravity will aid entry. However, it is also desirable that the coolant channels be designed for upward flow, so that when the reactor core is shut down, the coolant can be circulated using, in part, natural convection (upward) circulation. Upward flow of coolant past the top-entry control rods, however, exerts hydraulic forces on the rods which may more than overcome gravitational forces.

In a fast-neutron reactor, the core may contain a wide variety of subassemblies, each contained in an individual shroud. The subassemblies are generally hexagonal in cross section and, when assembled together, form a generally right-cylindrical core. Typical different subassemblies contain fuel elements, control materials, moderators and reflectors. It is important that the overall core have a stable, fixed configuration during reactor operation. Unexpected movement or vibration of the various elements may cause unexpected reactivity changes. In extreme cases, such changes may cause local overheating due to local flux changes which could damage fuel rods and/or cause an emergency shutdown of the reactor. "0°."

A wide variety of fuel rod assembly designs have been proposed for use in such reactors. The assembly must hold the fuel rods in the desired spaced arrangement, preventing rod movement or vibration while permitting differential thermal expansion.

Many designs, in which the fuel rods are secured to the assembly shroud at a plurality of points, cannot adequately compensate for thermal expansion differences, and thus cause the rods to bow or otherwise distort during changes in reactor and fuel rod temperature. Also, these more rigid designs do not adequately permit interassembly spaces to be eliminated by slight transverse assembly movement in clamping the core components together.

Some fuel assemblies include complex construction features intended to permit adjustment to overcome spacing, thermal expansion and core-clamping problems. These systems, however, are expensive, difficult to assemble and tend to fail in prolonged operation.

Spaced fuel rods located within an assembly may experience different rates of heat generation and resulting locally different temperatures. This condition may be the result of flux peaking in adjacent coolant channels, unequal distribution of coolant flow through the core, presence of adjacent structural material and the like. Accordingly, the spaced fuel rods are subject to unequal thermal expansion so that unless restraining means are provided the rods and bundles are subject to deformation or bowing. This may cause local hot spots where adjacent rods touch resulting in the decomposition or melting of the clad material. This may lead to the formation of cracks or openings in the clad which directly expose the fuel and fission product gases contained within the fuel rod to the coolant. When this occurs, not only must the fuel elements be replaced, requiring shutdown of the reactor, but the coolant will be contaminated with radioactive material. Also, severe bowing of peripherally located fuel rods may interfere with control rod movement.

Therefore, the intermediate spacers must have sufficient strength to prevent rod bowing due to temperature variations. In addition, the spacer must have sufficient strength to resist severe thermal and hydraulic forces which vary greatly between reactor-starting conditions and hot full power operating conditions.

On the other hand, excessively large and sturdy spacers may detrimentally affect reactor performance. If the spacer locally restricts coolant flow, local hot spots may occur causing local cladding failure as described above. The spacer should be as small as possible and have a low absorption cross section for neutrons so as to minimize "parasitic absorption." This absorption becomes significant where a great many spacers are required in the core.

Spacers which are complex and difficult to fabricate are undesirable, since a great many spacers are required in a single core and preferred materials, such as stainless steel, are difficult to fabricate in complex shapes. Similarly, spacer designs requiring a great many welds are difficult to consistently fabricate within the necessary tolerances.

If the contact area between the spacer and each fuel rod is too great, coolant flow to that area may be restricted, resulting in a hot spot. Conversely, if the contact area is too small, differential thermal expansion and vibrations induced by coolant flow may cause fretting damage to the clad at the contact point. Eventually, the damaged surface may crack, allowing the coolant to contact the fuel within the rod. In addition, loading fuel rods into a tight-fitting spacer may scratch or otherwise damage the surface of the rods.

One spacing system which has been proposed uses one or more thin wires wrapped spirally around each fuel rod in the assembly. The wire is secured to the rod near the top of the rod, wrapped around and down the rod, and secured to the rod near the bottom. This system is simple, reliable and easily assembled. In addition to spacing the fuel rods apart, the spiral form causes desirable turbulence in the coolant stream, resulting in improved heat transfer from the fuel rods to the coolant.

While good results are obtained with spiral wire spacers, several problems remain.

In prior art fuel assemblies using spiral wire spacers, it was found necessary to start each spacer at the same relative angular position on each fuel rod, and to use spirals of uniform pitch to prevent mechanical interference between wires and adjacent fuel rods. Obviously, a random starting arrangement would result in such interference. However, this uniform starting arrangement requires very exact dimensional control in the fuel rods and spacer wires, since there may be typically 20 to 40 fuel rods in a line across a fuel assembly, and the spacer wires are in alignment with the fuel rods at intervals along the rods. If the fuel rods or wires are even very slightly too large or too small in diameter, the assembly will be overly tight or loose at these intervals. This arrangement will not accommodate any swelling of fuel rods during reactor operation without distortion of the assembly shroud or the fuel rods. Furthermore, the fuel rods or wires cannot be made undersize to provide clearance which would accommodate the accumulation of tolerances, since this could result in clearance between the fuel rods and the shroud which might permit movement of the fuel during reactor operation. Such movement could result in damage to the fuel rods and might result in unstable nuclear characteristics for the reactor core.

Problems concerning the clearance between the outer row of fuel rods and the assembly shroud also arise in another manner. The spacing between adjacent fuel rods is established to optimize several factors, including the total pressure drop across the reactor core, the allowable cladding temperatures and the desired core exit coolant temperature. This spacing optimization establishes the diameter of the spiral spacing wire to be used in the given core.

However, with spacer wires of uniform diameter, there will be an equal gap between the fuel rods in the outer row of the assembly and the fuel shroud wall, which is not a significant heat source. This extra coolant flow gap results in an excess of coolant flow through this cooler portion of the assembly, reducing the coolant exit temperature which can be achieved with a given set of core conditions. It has been estimated that in a typical fuel assembly, this loss may be up to 10 percent of the desired temperature increase.

This "channeling" of flow along the shroud wall could be reduced by using a smaller diameter wire spacer around the fuel rods in the outer row. However, this technique is not practical, since then the wires on the next inner row of fuel rods would have to provide the spacing between the outer and next rows, since the smaller diameter wire on the outer row of fuel elements would not contact the next inner row. Thus, there will only be half the desired number of spacing contacts, which could permit fuel rod shifting, bowing or vibration.

Also, in a square rather than hexagonal fuel rod array, the outer row of fuel rods having the smaller diameter spacer wire could shift laterally along the shroud wall.

Thus, there is a continuing need for improvements in fuel assemblies using spiral wire spacers.

SUMMARY OF THE INVENTION

It is, therefore, an object of this invention to provide a nuclear fuel assembly which overcomes the above-noted problems.

Another object of this invention is to provide a fuel-rod-spacing system of improved simplicity and reliability.

Another object of this invention is to provide a nuclear fuel assembly which accommodates differential thermal expansion and transverse clamping movement in the multiassembly core.

Still another object of this invention is to provide a nuclear fuel assembly of improved simplicity and reliability.

Still another object of this invention is to provide a fuel-rod-spacing system which permits accurate control of fuel rod-shroud spacing.

The above objects, and others, are accomplished in accordance with this invention by providing a fuel assembly in which each fuel rod has a spirally wound spacing wire, the spiral wire on each rod starting at a different angular position in a uniform pattern to cause a controlled pattern of misalignment of spacing wires down through the assemblies and by providing thin hollow tubes as spacing wires for the outer row of fuel rods, the tubes being slightly flattened where they contact the assembly shroud to decrease flow of coolant between the outer row of fuel rods and the shroud. The fuel rods are preferably fastened only at their lower ends, to a plurality of spaced support bars which are secured to the shroud. A lower orifice, secured to the lower end of the shroud, is adapted to slidingly fit in an opening in a support plate while permitting slight transverse clamping movement of the shroud and fuel rod assembly.

Preferably, the gap between the fuel rods and nonfueled elements (e.g., the shroud and dummy rods) will be from about one-third to about one-half of the gap between adjacent fuel rods.

While more than one spacer wire may be used on each fuel rod it is preferred that a single wire be used since it is effective and minimizes the amount of neutron-absorbing material included in the fuel assembly.

While the nuclear fuel assembly of this invention is especially useful with a reactor of the fast-neutron breeder type, with coolant flow upward through the fuel assembly, the assembly and many of its features have utility in other types of reactors of the fast neutron type.

BRIEF DESCRIPTION OF THE DRAWINGS

Other features and advantages of this invention, and details of a preferred embodiment thereof, will become apparent upon reference to the drawing, wherein.

DETAILED DESCRIPTION OF THE INVENTION

Figure 1:
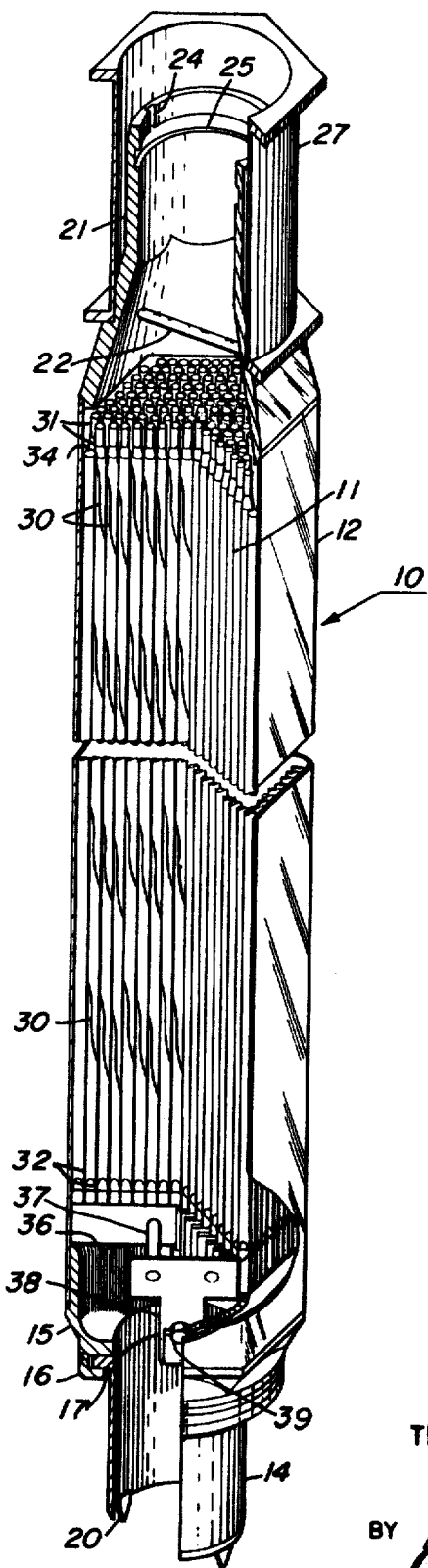
FIG. 1 shows the nuclear fuel assembly of this invention in perspective, partially cut away for clarity.

Referring now to FIG. 1 there is seen an isometric perspective view of a nuclear fuel assembly generally designated 10, partially cut away and shortened for clarity. Fuel assembly 10 consists primarily of a plurality of fuel rods 11 housed within an elongated hexagonal shroud 12. If desired, shroud 12 may have any other suitable cross section, such as square or round. Shroud 12 and the other fuel assembly structural members may be formed from any suitable material. In a fast reactor, stainless steel may be preferred, while a zirconium alloy may be preferred in a reactor utilizing thermal neutrons.

Coolant is admitted to the fuel assembly through a lower nozzle 14 which is secured to a shroud 12 by a lower transition casting 15 and a nozzle-retaining ring 16. Retaining ring 16 is secured to transition casting 15 as by welding. A flange 17 on lower nozzle 14 slidably fits between lower transition casting 15 and retaining ring 16. This sliding fit permits slight transverse movement of lower nozzle 14 with respect to shroud 12. Thus, when lower nozzle 14 is inserted in a lower seal plate, as is further described below, shroud 12 is free to be moved slightly transversely as the various core assemblies are clamped tightly together. Lower nozzle 14 projects slightly through the seal plate into the coolant inlet plenum. Several downwardly projecting prongs 20 are provided on the lower end of lower nozzle 14 to prevent the nozzle opening from being completely closed off accidentally during reactor operation by a loose metal plate or other flat foreign object which might be present in the inlet plenum.

Figure 7:
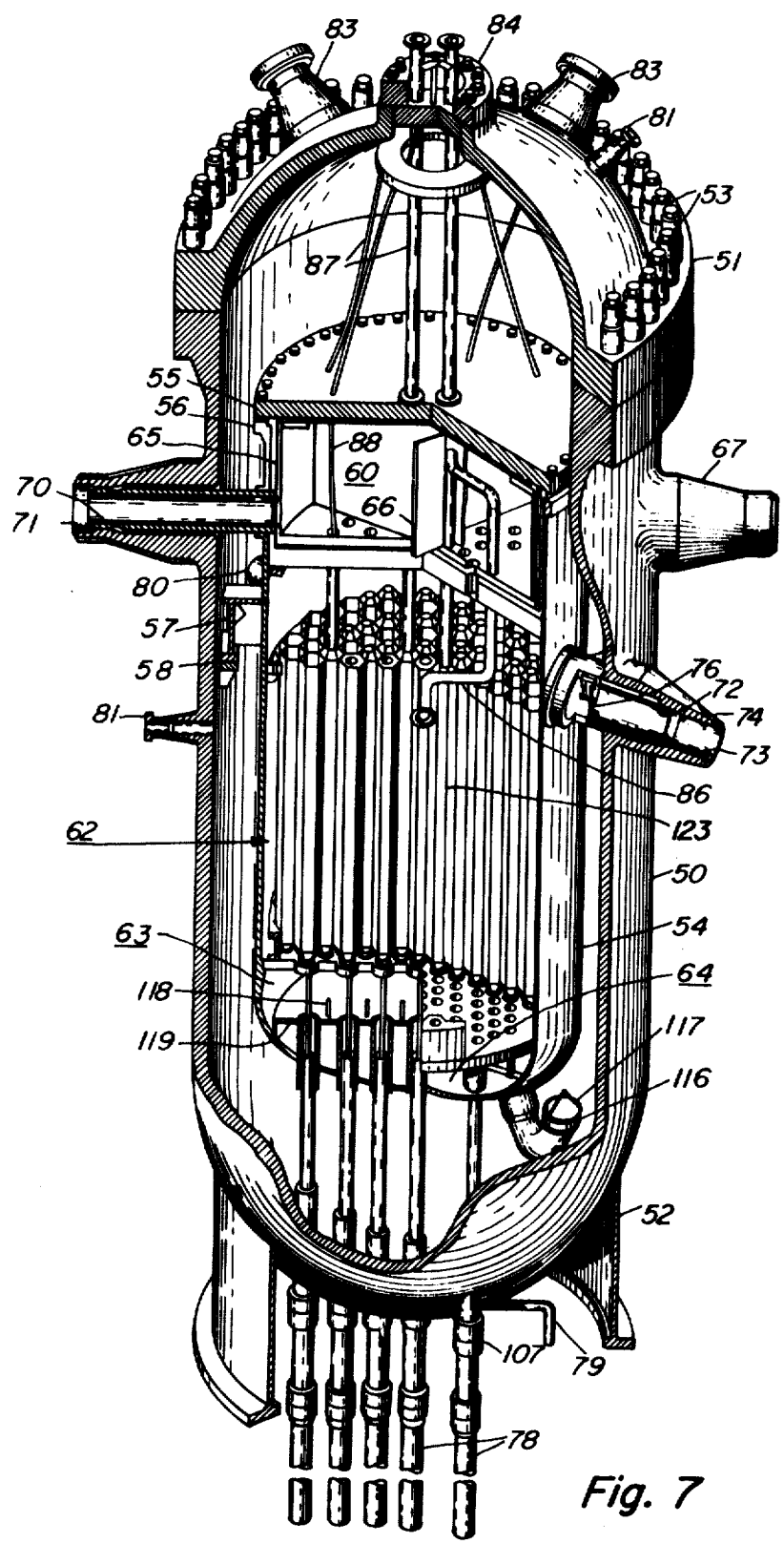
FIG. 7 is a perspective view of a nuclear reactor, partially cut away for clarity, in which the nuclear fuel assembly of this invention is especially useful.
Figure 8:
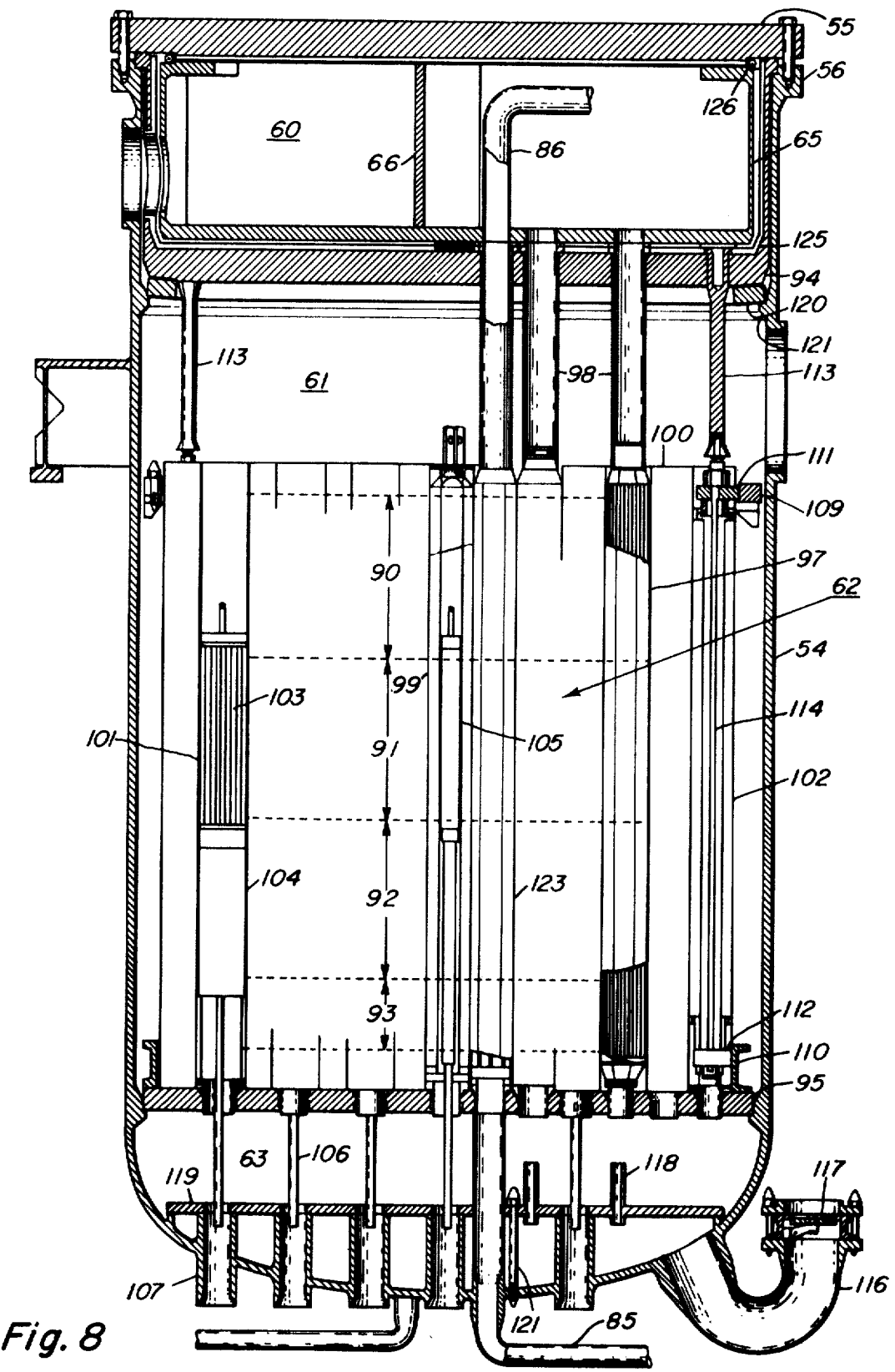
FIG. 8 is a vertical section through the core shroud of the nuclear reactor shown in FIG. 7, somewhat simplified for clarity.

Coolant passes upwardly between fuel rods 11 where it is heated and exits fuel assembly 10 through an upper nozzle 21. A lifting rod 22 is provided within upper nozzle 21 so that the fuel assembly may be lifted during core loading and during connection of fuel assembly 10 to the coolant outlet means as seen in FIGS. 7 and 8. A bayonet locking arrangement including a slot 24 and groove 25 is provided at the upper end of upper nozzle 21 to permit connection of the steam outlet means to fuel assembly 10. A suitable outlet means is described in detail in copending U.S. Pat. application Ser. No. 779,135, filed concurrently herewith.

A thermal sleeve 27 is provided around the upper end of outlet nozzle 21 to limit undesired heat transfer from the heated coolant within nozzle 21 to the surrounding environment.

Within shroud 12, the fuel rods 11 are arranged in a parallel spaced arrangement, in a plurality of rows. Each fuel rod 11 includes a spacer wire 30 which is secured to an upper end plug 31, is wrapped down and around the fuel rod and finally is secured to a lower end plug 32. These spacer wires 30 serve to maintain the fuel rods 11 in the desired spaced arrangement while permitting coolant to flow upwardly between fuel rods 11. Dummy fuel rods 34 which do not contain nuclear fuel material are provided at each corner of the hexagonal array. These dummy fuel rods are somewhat flattened as best seen in FIG. 2, permitting the shroud 12 to have more rounded corners, thus reducing stress concentrations at the corners.

Figure 3:
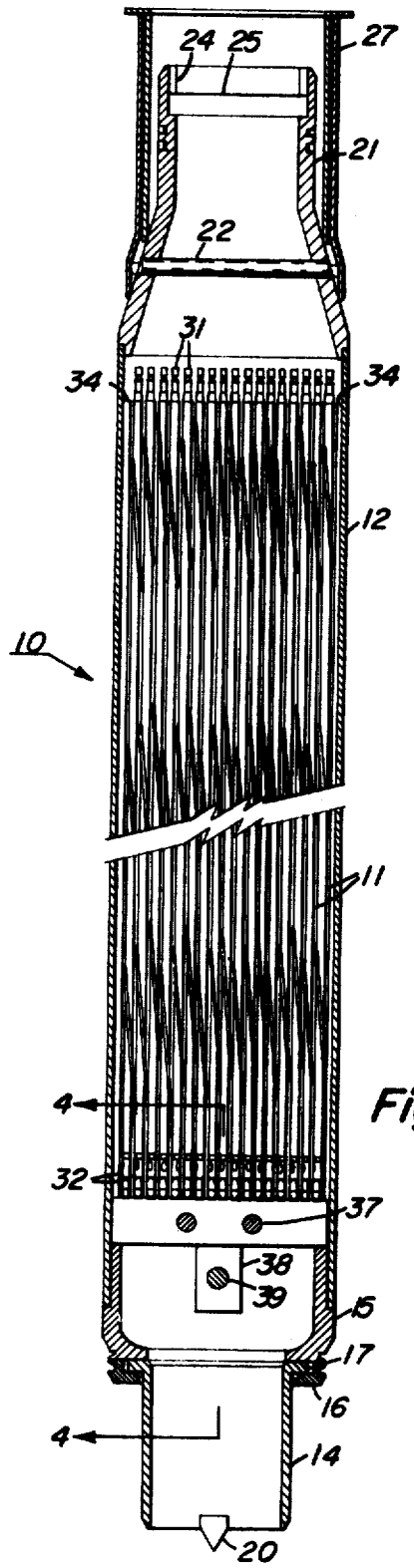
FIG. 3 is a vertical section through the nuclear fuel assembly, taken on line 3—3 in FIG. 2.
Figure 4:
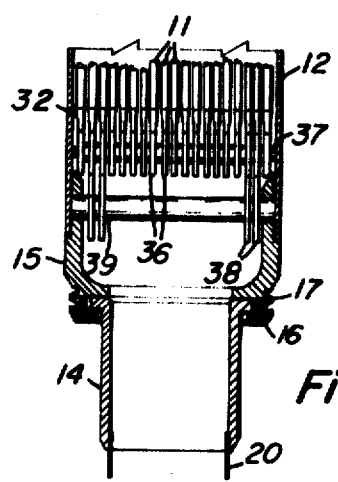
FIG. 4 is a vertical section through the lower portion of the nuclear fuel assembly, taken on line 4—4 in FIG. 2.

Fuel rods 11 are fixed to the shroud at their lower ends only. This permits the fuel rods to expand longitudinally during the reactor heatup without restraint. Each row of fuel rods 11 is secured to a fuel rod support bar 36, such as by welding. As best seen in FIGS. 3 and 4, the support bars 36 are held in a spaced parallel arrangement by a pair of pins 37. Several of the support bars 36 have downwardly extending portions 38 which are secured to lower transition casting 15 by rod 39. The ends of support bars 36 rest on the upper edge of transition casting 15, as seen in FIG. 3. This prevents the array from rotating about rod 39. Thus, it can be seen that the fuel rods are supported in a manner permitting complete compensation for differential thermal expansion during reactor operation. The arrangement of support bars 36 provides a strong and simple securing system while not duly hindering coolant flow through the fuel assembly.

Figure 5:
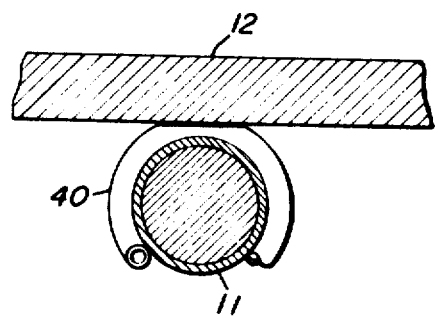
FIG. 5 is an enlarged detail view of a portion of the section shown in FIG. 2 showing the flattened spacer wire adjacent the fuel assembly shroud.
Figure 2:
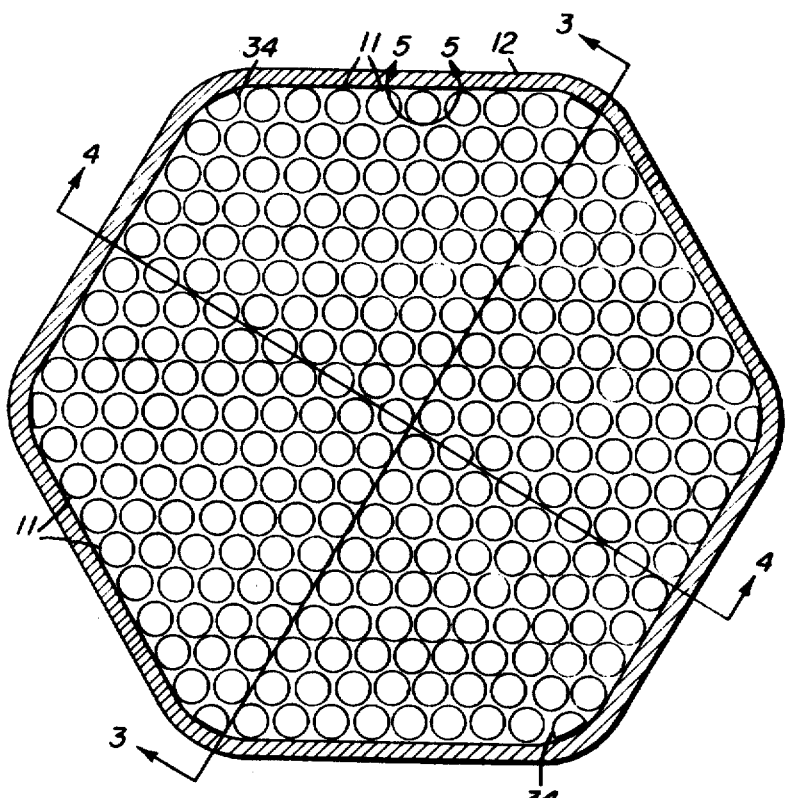
FIG. 2 is a horizontal section through the nuclear fuel assembly.
Figure 6:
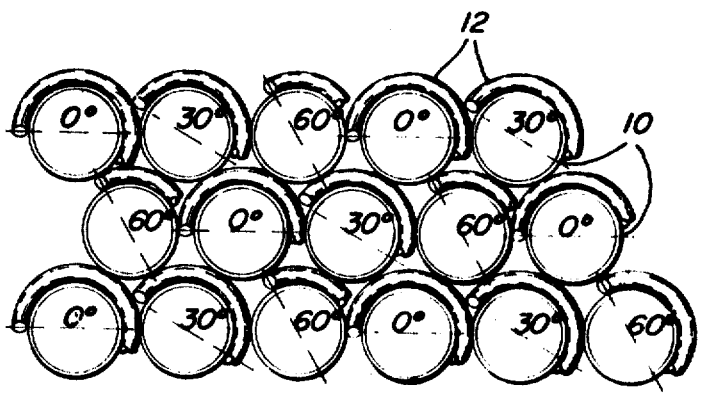
FIG. 6 is an enlarged view of a portion of the sectional view of FIG. 2 showing the regularly varied orientation of spacing wires.

FIGS. 5 and 6 show detail views of portions of FIG. 2 showing details of the spacer wire arrangement. In the embodiment shown in FIG. 2, fuel rods and 6 dummy corner rods 34 are arranged in spaced relationship within shroud 12. Dummy rods 34 do not contain fuel and are substantially flattened. This permits the radius of the corners of the shroud 12 to be sufficiently great to minimize localized stresses. In a typical fast reactor fuel assembly, the hexagonal shroud has an inside diameter between flats of about 4.58 inches. Each fuel rod has a diameter of about 0.228 inch. The interrod spacing is desirably about 0.0488 inch. With this interrod spacing, the spacing between the outer row of fuel rods 11 and the inner wall of shroud 12 should be about 0.02 inches. As is pointed out above, the gap between the outer row of fuel rods and the shroud should be less than that between adjacent fuel rods to restrict the flow of coolant therethrough since this flow is heated from only one side. Similarly, the gap between fuel rods 11 and dummy rods 34 should be decreased to about 0.02 inch for optimum efficiency.

As discussed above, merely reducing the diameter of the spacer wire around the outer row of fuel rods 11 has not been found to be effective. As seen in detail in FIG. 5, this problem of selective spacing may be overcome in accordance with this invention by using a small-diameter thin-walled tube in place of the spacer wire 30 around the outer row of fuel rods. This thin tube 40 has a diameter equal to that of the spacer wires; typically, 0.0488 inch. This tube may be conveniently flattened to about 0.02 inch in those locations which contact shroud 12 or dummy fuel rods 34.

Tubes 42 may be flattened where desired by any conventional means, such as by supporting the fuel rod including the spiral spacer tube in a suitable fixture and to flatten the spacer tube with a conventional light-duty press.

If desired, additional spacer wires not in contact with nonfueled assembly elements may be formed from tubes. This will desirably reduce the quantity of neutron-absorbing material in the reactor core. The tubular spacer wires may be filled with a neutron-moderating material, such as beryllium oxide. Generally, fast reactor cores include a small amount of neutron-moderating material to improve the Doppler coefficient. By incorporating some of this in the spacer wires, valuable space will be saved elsewhere in the core. Also, the tubular spacers could be filled with a burnable poison, such as gadolinium oxide. Such a poison helps control reactivity in a fresh core, then "burns" during irradiation and no longer is an effective neutron poison when the poison effect is no longer needed. Again, valuable core space is saved by including a portion of any required burnable poison in the tubular spacer wires.

As described above, where helical spacer wires are used problems often arise where all of the spacer wires have the same relative orientation at each location along the fuel rod lengths. This problem is overcome in accordance with the present invention by regularly varying the relative starting position of the spacer wires along rows of fuel pins. Details of a typical regular orientation pattern are shown in FIG. 6 which is an enlarged detail view of a portion of FIG. 2. In the embodiment shown in FIG. 6, one third of the fuel pins are given a base orientation referred to as "0°". The starting position of the spacer wire on the next adjacent rod is rotated 30°. The second adjacent fuel rod has its spacer wire starting at a position rotated 60°. The third adjacent fuel rod has its spacer wire starting from the same position as the first fuel rod. This resulting pattern using only three different orientations will assure that no more than one-third of the rods have their spacer wires in alignment in any given position along the fuel rod length. Also, this will assure that spacer wires on adjacent fuel rods will never be in direct alignment at any location. A random arrangement would not be desirable since mechanical interference between spacer wires on some adjacent rods would be probable. While one specific pattern of regularly varying spacer wire orientations is shown in FIG. 6, clearly many other variations would be possible.

Referring now to FIG. 7, there is seen a simplified perspective view of a nuclear reactor including an open-topped pressure vessel 50 closed by a head 51. Pressure vessel 50 is supported by a skirt 52 for mounting on a suitable foundation (not shown). Head 51 is secured to pressure vessel 50 by a plurality of bolts 53.

Within pressure vessel 50 is mounted an open-topped shroud 54 closed by a closure flange 55 seated on shoulder 56. Shroud 54 is supported by means of an annular support 57 resting on an inwardly projecting ring-shaped member 58 on the inner wall of pressure vessel 50. Annular support 57 is not rigidly fastened to ring 58 so that a slight amount of slippage is permitted to compensate for differing thermal expansion of shroud 54 and pressure vessel 50 during reactor heatup and cooldown.

Within shroud 54 are contained a superheated steam outlet plenum 60, a saturated steam inlet plenum 61 (FIG. 8), a core and reflector space 62, a lower steam plenum 63 and a flooding water inlet plenum 64.

Outlet plenum 60 is closed at the top by closure flange 55 and at the sides and bottom by exhaust divider and hold down 65 which includes vertical dividing plates 66 which divide outlet plenum 60 into a plurality of pie-shaped segments. Superheated steam leaves each of the plenum segments through a superheated steam outlet 67. Typically, there may be six plenum segments and six outlets. Each of outlets 67 consists of an inner sleeve 70 secured to shroud 54 and in slidable sealing engagement with an outer sleeve 71. This permits the two sleeves to slide with respect to each other to compensate for differential thermal expansion.

Saturated steam enters inlet plenum 61 through a similar arrangement of slidable inner sleeve 72 secured to shroud 54 within an outer sleeve 73, the combination of which makes up a saturated steam inlet 74. Typically, three such inlets may be arranged to deliver saturated steam to inlet plenum 61. A check valve 76 is located in each inner sleeve 72 to prevent loss of steam through inlet 74 should the saturated steam supply fail for any reason.

A plurality of control rod drives 78 penetrate the bottom of pressure vessel 50 and shroud 54. Only a few of the many control rod drives which would be used in a typical reactor are shown in FIG. 7, for clarity.

The space between the inner wall of pressure vessel 50 and shroud 54 is kept substantially filled with water during reactor operation. This provides neutron shielding and a convenient source of water to flood the core when the reactor is shut down. Water is admitted to this space through a shield and flood water inlet 80. Openings 81 are provided for instruments for monitoring and controlling the water level within pressure vessel 50. A cleanup line 79 is provided at the bottom of pressure vessel 50 to drain water therefrom, when desired.

Instrumentation outlets 83 and seal plug 84 are provided for the admission of steam sample lines, thermocouple connections, etc., into pressure vessel 50.

As is further discussed below, if desired, one test fuel assembly 123 may be provided with an individual saturated steam inlet line 85 (as seen in FIG. 8) and superheated steam outlet line 86 so that special fuel assemblies may be tested during reactor operation.

A plurality of instrumentation leads 87 may enter pressure vessel 50 through instrumentation outlets 83 and seal plug 84. As is further indicated below, this reactor is unusually well adapted to permit individual sampling of steam output from each fuel assembly. A typical steam-sampling line is shown at 88.

Figure 9:
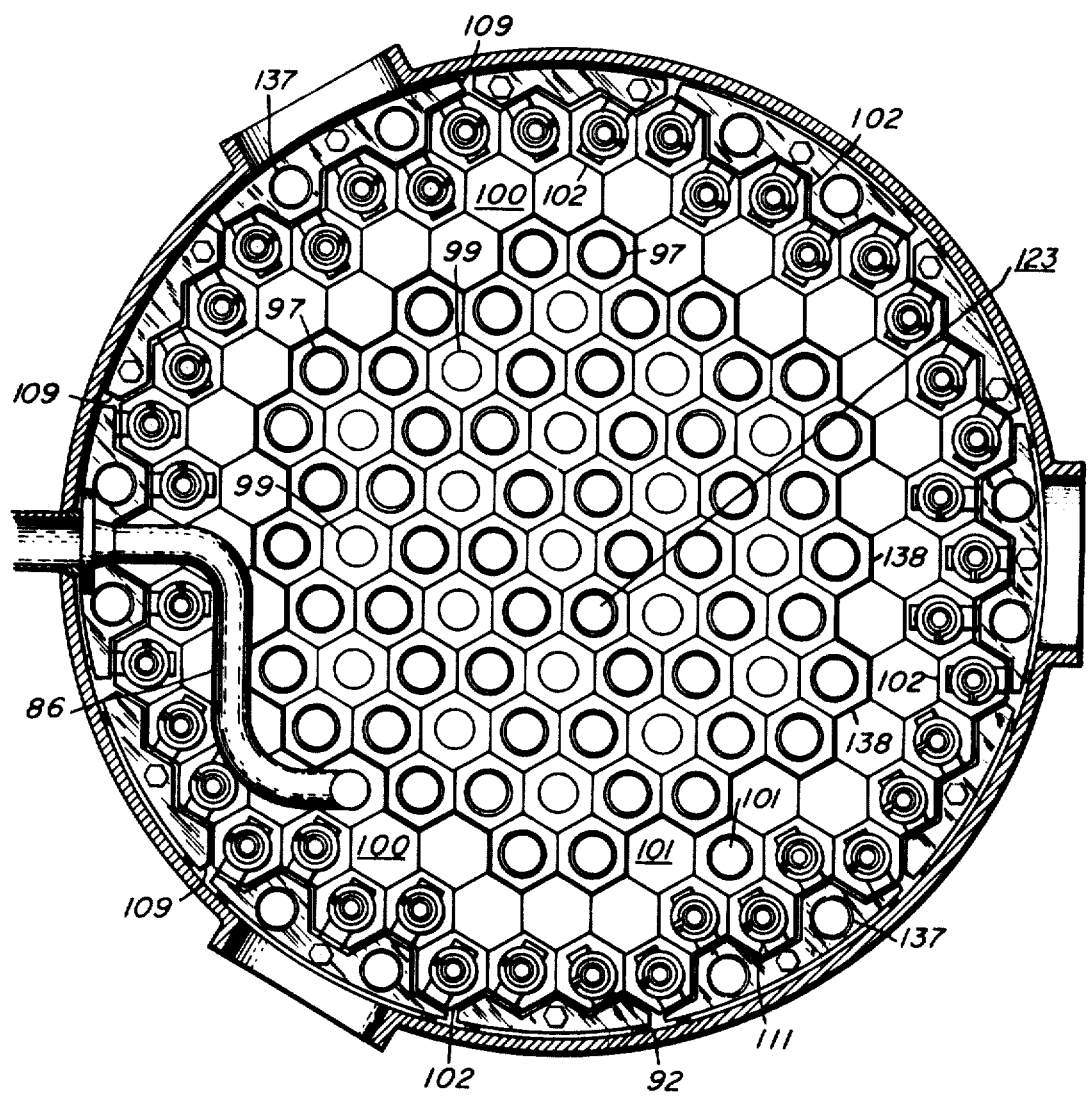
FIG. 9 is a horizontal section through the reactor core.

Details of the arrangement of components within shroud 54 may best be understood by considering FIGS. 7 and 8 together. Figure 8 shows a vertical section through shroud 54, somewhat simplified for clarity. While the core and blanket region contains many fuel subassemblies, control rods, reflector assemblies, etc., as seen in FIG. 9, only one of each is detailed in FIG. 8.

The overall reactor core 62 is divided axially into four sections, an upper blanket 90, an active fuel region 91, a lower blanket 92 and a gas plenum region 93. These sections are illustratively divided by dashed lines in FIG. 8. Radially, the overall reactor core 62 is divided into two sections, as best seen in FIG. 9. The central section consists of fuel subassemblies 97 and control assemblies 99 while the outer ring-shaped section consists of reflector assemblies 100, reflector-clamp assemblies 102 and reflector-control assemblies 101.

All of the subassemblies which make up overall core 62, except the fuel subassemblies, are supported at its lower end by core plate 95, which is in turn supported by an inwardly projecting shoulder 96 on shroud 54. As is further described below, these nonfuel assemblies are primarily made up of multirod subassemblies which permit saturated steam to flow downwardly therethrough from inlet plenum 61 to lower steam plenum 63.

Each of fuel assemblies 97 is secured to an orifice and seal assembly 98 which is suspended from seal plate 94. Fuel assemblies 97 are thus held out of weight-bearing contact with core plate 95, although a cylindrical nozzle 14 (FIG. 1) on each fuel assembly passes through holes in core place 95 in sliding contact therewith. The spacing between the fuel assemblies and core plate 95 allows for thermal expansion of the fuel assemblies during reactor operation. These orifice-seals 98 and the fuel assembly support system are described in detail and claimed in copending application Ser. No. 779,135, filed concurrently herewith.

Reflector-control assemblies 101 include an upper control section 103 and a lower reflector section 104. Control section 103 includes a plurality of rods of a neutron-absorbing or "poison" material, such as boron carbide. Reflector section 104 includes a plurality of rods of a neutron-reflecting material, such as nickel. In FIG. 8, the reflector-control assembly 101 is shown in the maximum control position, with the neutron-absorbing section adjacent fuel region 91. As assembly 101 is moved upwardly, control decreases as the neutron-absorber is replaced by neutron-reflector 104. Saturated steam passes downwardly through assembly 101, past the neutron absorbing and reflecting elements. This steam tends to both cool the assembly and aid gravity in moving the control section into the maximum control position.

Reflector assemblies 100 each consists of a plurality of spaced rods comprising a neutron-reflecting material such as nickel within a hexagonal shroud.

Control assemblies 99 each include a plurality of spaced rods each containing neutron-moderating material such as beryllium oxide, surrounding a cylindrical core within which a unit 105 made up of several neutron-absorbing rods is movable. Unit 105 is shown in FIG. 12 in the maximum control location. To increase the reactivity within fuel region 91, unit 105 is raised. Saturated steam coolant passes downwardly through each control assembly 99, cooling the assembly and aiding gravity in moving unit 105 into the fuel region in the event of an emergency.

All of the control assemblies 99 and reflector-control assemblies 101 are moved by conventional drive means (not shown) which connect to drive rods 106 through thimbles 107.

Around the outside of core 62 is located a ring of reflector-clamp assemblies 102. Around the upper and lower ends of core 62 are located an upper edge plate 109 and a lower edge plate 110, respectively. These plates conform to the irregular cylindrical shape of the core. Within each of the reflector-clamp assemblies 102 is located a plurality of spaced rods made up of a neutron-reflecting material, such as nickel and a pair of rams 111 and 112, adapted to be moved outwardly against upper and lower edge plates 109 and 110, respectively. As these rams move outwardly, the assembly bodies press inwardly, clamping the core 62 tightly together. This prevents core movement during reactor operation which would result in undesired reactivity changes. A clamp holddown rod 113 engages the upper end of a torque rod 114 in each reflector clamp assembly 102.

During reactor construction, or after refueling, etc., the core is first assembled as shown. Then seal ring 120 is placed within shroud 54 in engagement with an annular, inwardly projecting ridge 121. When seal plate 94 is lowered into place, it engages and deflects the inner edge of seal ring 120. This results in an excellent gas and liquid seal between the wall of shroud 54 and seal plate 94. Orifice-seals 98 are lowered into place and the fuel assemblies 97 are raised out of weight-bearing contact with core plate 95 and locked to orifice-seals 98.

Clamp operating tools are brought into engagement with ram drive rods 114 and are operated to drive rams 111 and 112 outwardly to tightly clamp core 62 together.

Exhaust divider and holddown 65 is lowered into place. This holds orifice-seals 98 and holddown rods 113 in place.

While most of the orifice-seals 98 align with openings in holddown 65 to deliver superheated steam into outlet plenum 61, one or more may align with an individual test loop outlet pipe 86. Thus, an individual test fuel assembly may be provided with independent saturated steam inlet 85 and superheated steam outlet pipe 86. While in a strictly power reactor this test loop may be eliminated, this reactor design is exceptionally well adapted to having such a test facility included.

Thermal insulation 125 may be provided to decrease heat transfer from superheated steam outlet plenum 60 to saturated steam inlet plenum 61, if desired.

Finally, closure flange 55 is installed. A plurality of rollers 126 are provided between closure flange 55 and exhaust divider and hold down 65 to permit pressure contact while allowing for differential thermal expansion.

As described above, when internal pressure within shroud 54 drops below a preset value, as during an emergency or during reactor shutdown, the core is automatically flooded with water. One of several flooding valves 116 is shown in FIGS. 7 and 8. When shroud internal pressure drops, check valve 117 opens, admitting water into flooding water inlet plenum 64. A plurality of flooding nozzles 118 are arranged on closure plate 119 in alignment with fuel assemblies 10 in core 62. Plate 119 is held in place by a plurality of bolts 121. Slight leakage through the shroud into plenum 64 is immaterial, since both spaces are water filled. Nozzles 118 immediately direct flooding water into fuel assemblies 97 to immediately begin cooling them. Since the flow of steam coolant during reactor operation is upward through the fuel assemblies, it is not necessary to reverse coolant flow during flooding. Also, flow of water through the fuel assemblies in the upward direction is aided by natural convection.

The cross-sectional arrangement of the various core components is further shown in FIG. 9, which is a horizontal section through shroud 14.

This typical overall core 62 includes 54 fuel assemblies, 53 of which are regular fuel assemblies 97 and one of which is a test fuel assembly 123. Of course, if desired in a strictly power plant reactor, all of the fuel assemblies could be conventional and the test loop could be eliminated. Conversely, if desired, additional test loops could be easily added to this reactor.

A heavy black line 138 schematically separates the fuel region from the radial reflector region. Within the fuel region are included 19 control assemblies 99 which include both neutron-moderating and neutron-absorbing material. The reflector region includes 18 reflector-control assemblies 101, 18 stationary reflector assemblies 100 and 42 reflector-clamp assemblies 102.

The reflector-clamp assemblies include rams 111 which bear against interrupted edge plate 109 to tightly clamp core 62 together. Downflow tubes 137 pass through edge plate 109 to lower steam plenum 63.

We claim:

1. A nuclear fuel assembly for a nuclear reactor comprising:
 a. an elongated hollow shroud having a coolant inlet at one end and a coolant outlet at the other; the one-third one-half
 b. a plurality of substantially parallel nuclear fuel rods within said shroud;
 c. means securing at least one end of each of said fuel rods in fixed spaced relationship with respect to each other and to said shroud;
 d. at least one thin spacer wire wrapped down and around each fuel rod in the same spiral direction, said spacer wires secured to the fuel rod at each end of the fuel rod;
 e. the relative starting position of spacer wires on different fuel rods varying in a regular repeating pattern of at least two different angular positions with respect to each fuel rod axis wherein the distance between all of the adjacent fuel rods is equal to the thickness of said spacer wires; and
 f. at least those spacer wires which contact nonfueled elements consisting of thin tubes which are flattened where they contact nonfueled elements whereby the gap therebetween is decreased.

2. The fuel assembly according to claim 1 wherein the pattern of varying spacer wires starting positions consists of three different relative angular positions.

3. The fuel assembly according to claim 1 wherein said shroud is hexagonal in cross section and includes nonfueled dummy fuel rods at the corners thereof; said spacers consisting of flattened tubes where they contact the inner wall of said shroud and the dummy fuel rods.

4. The fuel assembly according to claim 1 wherein said tubular spacer wires in contact with nonfueled elements are flattened sufficiently to decrease the gap between fuel rods and nonfueled elements to from about one-third to about one-half of the gap between adjacent fuel rods.

5. The fuel assembly according to claim 1 wherein at least one of said tubular spacer wires contains a neutron-moderating material.

6. The fuel assembly according to claim 1 wherein at least one of said tubular spacer wires contains a burnable neutron poison material.

7. The fuel assembly according to claim 1 wherein said securing means comprises a plurality of spaced parallel bars, to each of which is fastened a row of fuel rods in spaced relationship, with at least one of said bars fastened to said shroud adjacent said coolant inlet.

8. The fuel assembly according to claim 1 further including projecting means on said coolant inlet preventing a flat element from completely closing said inlet.

9. The fuel assembly according to claim 1 further including means connecting said coolant inlet to said shroud, said connecting means permitting slight relative transverse movement between said shroud and said coolant inlet.

10. The fuel assembly according to claim 1 further including a thermal insulation sleeve surrounding said coolant outlet.

11. The fuel assembly according to claim 1 further including a lifting rod within said coolant outlet secured to said coolant outlet.

12. In a fuel assembly for a nuclear reactor which includes an elongated hollow shroud housing a plurality of substantially parallel nuclear fuel rods which are spaced from each other by thin wires secured to one end of each fuel rod and wrapped down and around the fuel rod in the same spiral direction and secured to the other end of said fuel rod, the improvement wherein the relative angular starting position of each spacer wire with respect to the fuel rod axis are varied in a regular repeating pattern and the distance between all of the adjacent fuel rods is equal to the thickness of the spacer wires, whereby all of the spacer wires are never aligned at any position along the fuel assembly while mechanical interference between adjacent spacer wires is prevented.

13. The fuel assembly according to claim 12 wherein the pattern of varying spacer wires starting positions consists of three different relative angular positions.

14. In a fuel assembly for a nuclear reactor which includes an elongated hollow shroud housing a plurality of substantially parallel nuclear fuel rods which are spaced from each other by thin spacer wires secured to one end of each fuel rod and wrapped down and around the fuel rod in spiral fashion and secured to the other end of the fuel rod, the improvement wherein at least those spacer wires which contact nonfueled elements consist of thin tubes which are flattened where they contact nonfueled elements, whereby the gap therebetween and resultant coolant flow therebetween are decreased.

15. The fuel assembly according to claim 14 wherein said shroud is hexagonal in cross section and includes nonfueled dummy fuel rods at the corners thereof; said spacers consisting of flattened wires where they contact the inner wall of said shroud and the dummy fuel rods.

16. The fuel assembly according to claim 14 wherein said tubular spacer wires in contact with nonfueled elements are flattened sufficiently to decrease the gap between fuel rods and nonfueled elements to from about one-third to about one-half of the gap between adjacent fuel rods.

17. The fuel assembly according to claim 14 wherein at least one of said tubular spacer wires contains a neutron-moderating material.

18. The fuel assembly according to claim 14 wherein at least one of said tubular spacer wires contains a burnable neutron poison material.